March 26, 1963 R. L. BISHOP 3,082,631
GYROSCOPIC APPARATUS
Filed June 28, 1949 3 Sheets-Sheet 1
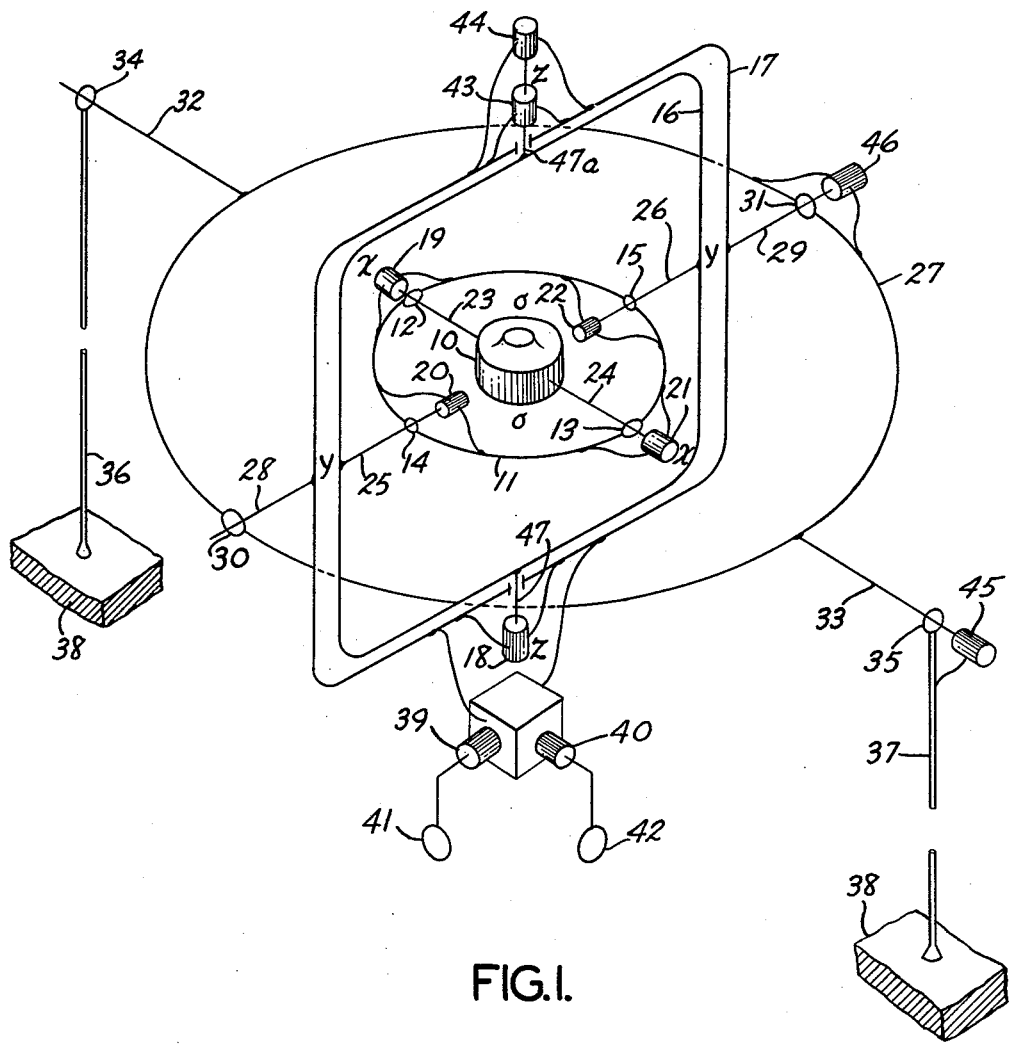
FIG.I.
INVENTOR.
RONALD L. BISHOP
BY
his ATTORNEYS.

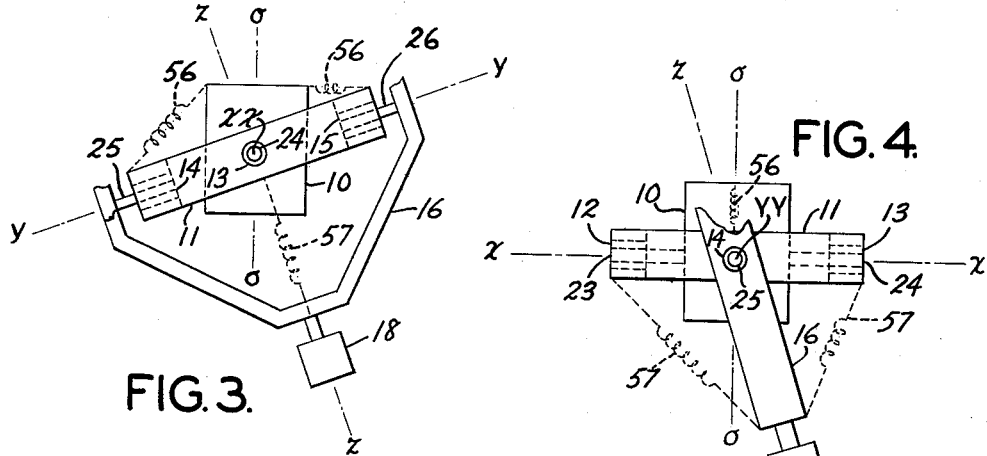
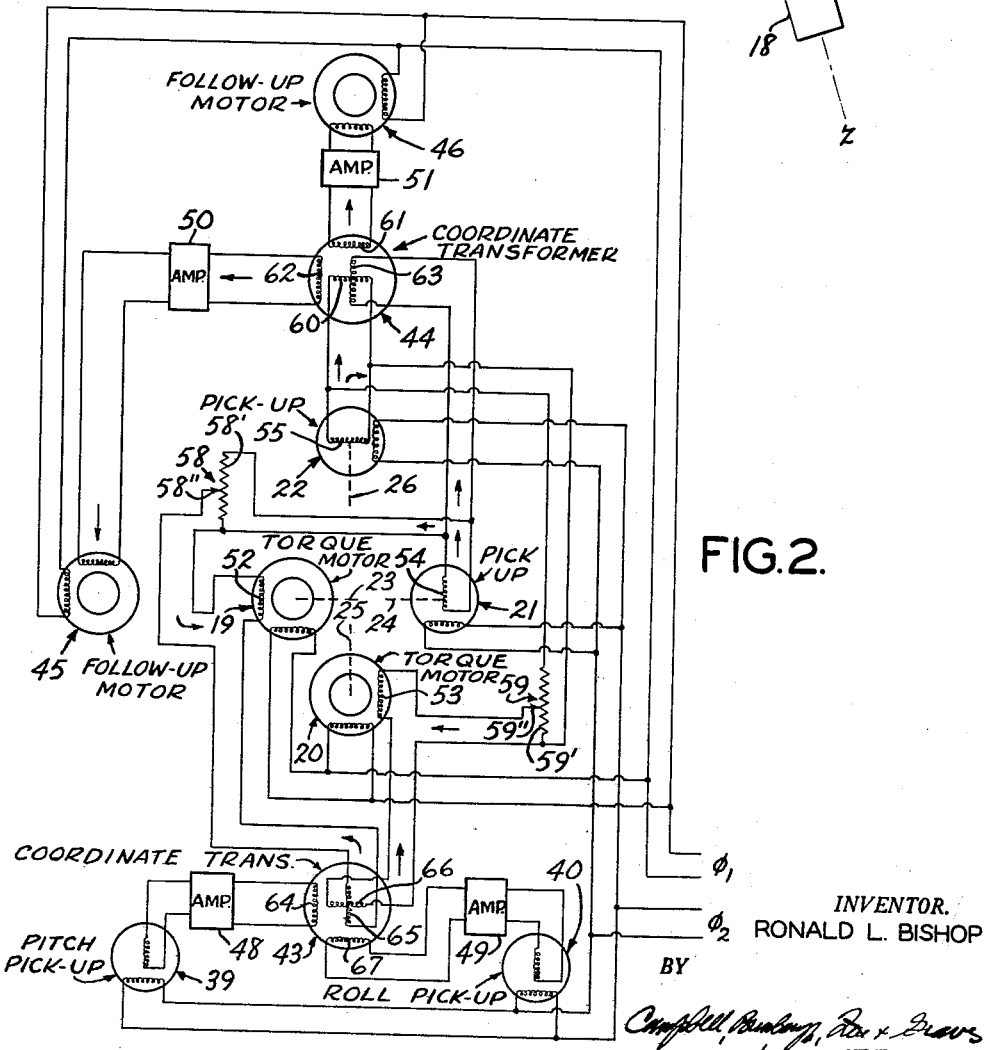

United States Patent Office 3,082,631
Patented Mar. 26, 1963

3,082,631
GYROSCOPIC APPARATUS
Ronald L. Bishop, Oceanside, N.Y., assignor to American Bosch Arma Corporation
Filed June 28, 1949, Ser. No. 101,793
20 Claims. (Cl. 74—5.47)

This invention relates to gyroscopic apparatus, and has particular reference to electromechanical devices for neutralizing the error-producing stiffness torques occurring in a gyroscopic instrument such as a gyrocompass, stable element and the like.

The torques which are neutralized according to this invention arise in suspension members, bearings, electrical connections and mechanical linkages and are functions of the relative angular displacement between the fixed and moving members. Some of these torques tend to minimize each other but seldom balance out, so that substantial residual torques remain and it is the principal object of the present invention to apply a counter torque of equal magnitude about the axis of angular motion to cancel the residual torque in each case.

In accordance with the invention, the compensating torque is automatically applied about the axis of angular motion, simultaneously with the occurrence of the error-producing torque, by utilizing the output signal of an electrical pickup device whose output voltage is proportional to the angular displacement between the two members, to control the torque motor producing the counter torque. In one form of the invention, the electrical pickup device responding to a tilt about one suspension axis is electrically connected to the torque motor acting about the same suspension axis, while electrical pickup device responding to a tilt about the other coordinate suspension axis and its corresponding torque motor acting about said other suspension axis are electrically connected together, with the pickup device outputs so adjusted by potentiometers that the applied counter torque of each torque motor about its axis is equal in magnitude to the torque produced by the spring-like error-producing forces about the same axis, whereby the error-producing torque is effectively neutralized. In another form of the invention, the resultants of the torques applied by torque motors about respective coordinate suspension axes are averaged by the rotation of the inner gimbal system, and the averaged value is applied in opposite sense about the same axis about which the averaged resultant error-producing torque acts, and the error-producing torques are effectively neutralized by adjusting potentiometers in the respective pickup output circuits so that the magnitude of the averaged resultant correcting torque is equal to the magnitude of the averaged resultant error-producing torque, whereby the latter torque is continuously neutralized.

It will be seen that the inherent errors in gyroscopic apparatus caused by the error producing torques of electrical connections and the like are automatically neutralized with the arrangement of the present invention in a simple and effective manner without requiring a material increase in the size and weight of the apparatus.

For a more complete understanding of this invention, reference may be had to the accompanying drawings in which:

FIGURE 1 is a schematic representation of a stable element to which the invention may be adapted;

FIG. 2 is a wiring diagram of the electrical connections between the elements of FIG. 1;

FIGS. 3 and 4 illustrate the relative positions of the gyroscope, the inner gimbal ring and the gimbal rotating frame in two positions, with a portion of the latter broken away in the interest of clarity.

Figure 5:
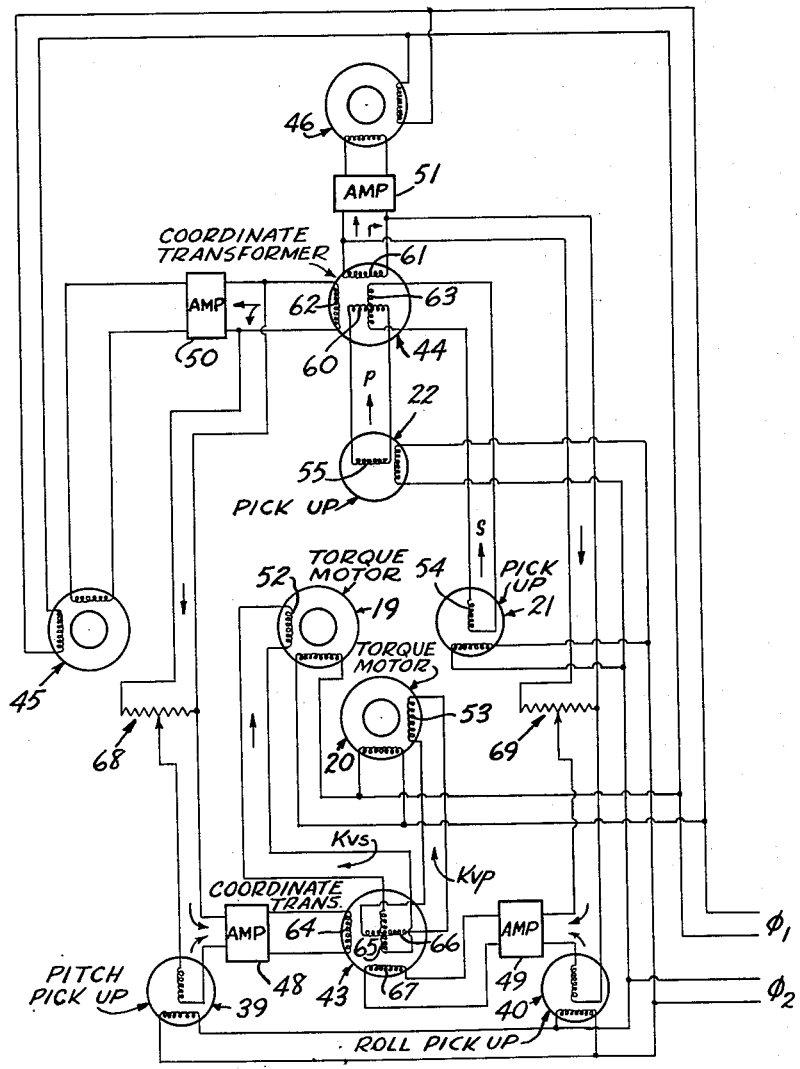
FIG. 5 is a modification of the circuit of FIG. 2.

Referring to FIG. 1 of the drawings, the stable element there shown as illustrating an adaptation of the invention is disclosed in greater detail in copending application Serial No. 738,242, filed March 29, 1947 by George Agins, now Patent No. 3,009,361. For convenience it will be described briefly, and includes a vertical spin axis gyroscope 10 of the electrically-driven type mounted in the inner gimbal ring 11 by means of supporting shafts 23 and 24 journaled in bearings 12 and 13, respectively. Attached to the inner gimbal ring 11 is the stator of torque motor 19, the rotor of which is connected to shaft 23. Also mounted on inner gimbal ring 11 is the stator of electrical pickup device 21, the rotor of which is connected directly to shaft 24.

Inner gimbal ring 11 carries bearings 14 and 15 in which are journaled the shafts 25 and 26 of inner vertical frame 16, respectively. Also carried by inner gimbal ring 11 is the stator of torque motor 20 whose rotor is connected to shaft 25. Similarly, the stator of electrical pickup device 22 is carried by the inner gimbal ring 11, and the rotor is connected to shaft 26.

Inner vertical frame 16 is mounted on vertical shafts 47 and 47a journaled for rotation within outer vertical frame 17 by gimbal rotation motor 18, the stator of which is carried by the outer vertical frame 17, and whose rotor is connected to shaft 47 of inner vertical frame 16. Shaft 47a is also connected to the rotors of coordinate transformers 43 and 44, whose stators are carried by outer vertical frame 17.

Outer vertical frame 17 is movable about a horizontal axis on the outer stabilized gimbal ring 27 by means of supporting shafts 28 and 29 which are journaled near their outer ends in respective bearings 30 and 31. The stator of follow-up motor 46 is carried by outer stabilized gimbal ring 27, while its rotor is connected to shaft 29 through gearing, not shown.

Outer gimbal ring 27 is supported by means of supporting shafts 32 and 33 journaled respectively in bearings 34 and 35 of supports 36 and 37 secured to the unstable platform 38. The stator of follow-up motor 45 is mounted on support 37, and its rotor is connected to shaft 33 through gearing, not shown.

Carried on a center bracket supported by and below outer stabilized vertical frame 17 are electrical pickup devices 39 and 40. Suspended from the shaft of pickup device 39 is pendulum 41 free to swing only in a plane at right angles to the axis through bearings 30, 31 and suspended from the shaft of pickup device 40 is pendulum 42 free to swing only in a plane parallel to the plane of stabilized gimbal ring 17.

The operation of the stable element just described as disclosed in greater detail in said copending application will be briefly summarized in connection with FIG. 2 showing the electral connections between the components of the stable element of FIG. 1, but omitting for the sake of simplicity, the usual resolvers, torque motors for applying correction to pendulums 41 and 42, self synchronous transmitters and dials. As indicated in FIG. 2, the main fields of torque motors 19, 20 and follow-up motors 45, 46 are energized by $\phi_1$ of a two phase alternating voltage supply, while the stator windings of the pickup devices 21, 22, 39, 40 are energized by $\phi_2$ of that same supply.

Assuming that the stable element is in the instantaneous position shown in FIG. 1, the axes of shafts 28, 25, 26 and 29 are aligned, the axes of shafts 32, 23, 24 and 33 are aligned and these two axes are perpendicular to each other and to the spin axis of the gyroscope 10 which is indicating the true vertical. Also, in these conditions, if the unstable platform 38 is the horizontal deck of a ship, the supports 36 and 37 lie in the fore-and-aft vertical plane. Since the outer stabilized ring 27 is restrained from free rotation in bearings 34 and 35 by the frictional resistance of gearing, not shown, but interposed between shaft 33 and the rotor of follow-up motor 45, a movement of the unstable platform 38 from its level position in roll displaces the rotor of electrical pickup device 21 from its zero position. In view of the energization of the stator thereof, a voltage is induced in the rotor of pickup device 21 and is fed through coordinate transformer 44 and amplifier 50 to follow-up motor 45, which accordingly drives the outer stabilized gimbal ring 27 through an angle equal and opposite to the angle of roll.

Similarly, a movement of the unstable platform 38 in pitch, displaces the rotor of electrical pickup device 22, since the gearing between shaft 29 and the rotor of follow-up motor 46 initially causes the pitch motion to be transmitted to the outer vertical frame 17. The output voltage induced in the rotor of pickup device 22 is fed through coordinate transformer 44 and amplifier 51 to actuate follow-up motor 46, which drives outer vertical frame 17 through an angle equal and opposite to the angle of pitch.

Inasmuch as any movement of the unstable platform out of the horizontal can be resolved into its component movements in roll and pitch, the outer stabilized gimbal ring 27 and the outer vertical frame 17 are each driven through the corresponding angles of roll and pitch by the action of coordinate transformer 44 which causes continuous application of the correct voltages to the respective roll and pitch follow-up motors 45 and 46 during all rotational positions between the inner and outer vertical frames 16 and 17. The pitch and roll pendulums 41 and 42, their respective pickups 39 and 40, amplifiers 48 and 49, coordinate transformer 43 and torque motors 19 and 20 function as described in said copending application to continuously erect and maintain the spin axis of the gyroscope in the true vertical position.

The inner gimbal system including ring 11 and frame 16, is rotated by gimbal rotation motor 18 about normally vertical axis 47—47a in order to average to zero the precession of the gyroscope caused by any unbalance of weight in the inner gimbal system. An angular displacement between the vertical spin axis of the gyroscope 10 and the axis of inner gimbal system rotation 47—47a may occur if a "servo zero error" is present, which in turn causes disturbing torques to be applied to gyroscope 10. The "servo zero error" is caused by an extraneous output of amplifiers 50 and 51 when the outputs of pickup devices 21 and 22 are zero. Follow-up motors 45 and 46 are therefore energized and drive gimbal ring 27 and frame 17 until the signals of pickup devices 21 and 22 cause the outputs of amplifiers 50 and 51 to be zero, consequently displacing the axis of inner gimbal system rotation from the gyroscope spin axis by a small angle.

Due to this angular displacement between the gimbal rotation and gyroscope spin axes and the simultaneous rotation of the inner gimbal system, spring-like forces are applied to the gyroscope 10, thus producing errors of precession. These spring-like forces are introduced by (1) the stiffness effect of bearings 12 and 13, (2) the stiffness effect of bearings 14 and 15, (3) the spring-like connectors such as electrical conductors between gyroscope 10 and gimbal ring 11, (4) the spring-like electrical connectors between gimbal 11 and rotating frame 16, and (5) the inertia of gimbal ring 11, some of these effects being more pronounced than others and augmenting one another to multiply the effect in one direction or the other, whereas some effects tend to counteract others to a degree, depending upon the particular conditions of construction and operation of the instrument.

Referring to FIGS. 3 and 4 which illustrate in an exaggerated way the relative positions of the inner gimbal system members when the axis of rotation of gimbal frame 16 is not aligned with the spin axis of the gyroscope 10, the principal axes under discussion are there designated as the $x$, $y$, $z$ and $o$ axes and are respectively the axis through bearings 12 and 13, the axis through bearings 14 and 15, the axis of gimbal rotation 47—47a and the axis of spin of gyroscope 10.

Due to the angular displacement between the $o$ and $z$ axes, the gimbal ring 11 assumes various positions with respect to these axes as the gimbal system is rotated about the $z$ axis, and for ease of description, the angular displacement of the plane of gimbal ring 11 about the $y$ axis from the plane perpendicular to the $z$ axis will be referred to as the "tilt of gimbal ring 11 about $y$." Similarly, the angular displacement of the plane of gimbal ring 11 about the $x$ axis from the plane perpendicular to the $o$ axis will be referred to as the "tilt of gimbal ring 11 about $x$." The direction of the tilt is either clockwise or counterclockwise when viewed from the bearing 14 end of the $y$ axis and when viewed from the bearing 13 end of the $x$ axis.

FIG. 3 illustrates the condition in which the gimbal system rotation is in stationary or zero position, and the tilt of gimbal ring 11 about $x$ is maximum counterclockwise and is zero about $y$. One-quarter of a revolution later, as illustrated in FIG. 4, the tilt of gimbal ring 11 about $y$ is a maximum clockwise and is zero about $x$. In succeeding rotational positions, each one-quarter of a revolution later, the title of gimbal ring 11 about $x$ first becomes maximum clockwise, then zero and again maximum counterclockwise as it returns to the original position, while at these same instants the tilt of gimbal ring 11 about $y$ becomes zero, then a maximum counterclockwise and again zero as the revolution is completed.

The forces due to effect (1) i.e., of stiffness of bearings 12 and 13, and the spring-like effect (3) i.e., of electrical conductors between gimbal ring 11 and gyroscope 10, are proportional to the tilt of gimbal ring 11 about $x$ for small angular displacements and always act about the inner pivots, i.e., about the $x$ axis, and can therefore be considered to result from springs such as those represented by spring-like connections 56 in FIGS. 3 and 4.

The forces due to effect (2) i.e., stiffness of bearings 14 and 15, effect (4) i.e., of the spring-like conductors between gimbal 11 and frame 16, and effect (5) i.e., inertia of gimbal ring 11, are proportional to the tilt of gimbal ring 11 about $y$ for small angular displacements and always act about the outer pivots, i.e., about the axis $y$, so that they can be considered as resulting from springs such as those represented by spring-like connections 57 in FIGS. 3 and 4.

For each revolution of the inner gimbal system 11, 16, the average resultant error-producing torque, due to spring-like connections 56 and 57 acting on the gyroscope 10, is a torque acting on the gyroscope about an axis perpendicular to the plane which contains both the spin axis $o$—$o$ and the axis of gimbal rotation $z$—$z$, thus resulting in precession of the gyroscope, whereby its spin axis is moved into the plane displaced 90° from the plane which contains both the spin axis and the axis of gimbal rotation.

The aforementioned error-producing torques are nullified according to the present invention by applying compensating torques which are equal and opposite to the torques caused by the spring-like forces about the $x$ and $y$ axes. Beginning with the discovery that the output of pick-up device 21 is proportional to the force of spring-like connection 56 and that the output of pickup device 22 is proportional to the force of spring-like connection 57, it has been found that the compensation may be effected proportionally. Thus, the output winding 54 of electrical pickup device 21, which is electrically connected to the input winding 63 of coordinate transformer 44, is also electrically connected to the end taps of potentiometer 58, according to this invention, this being the first modification of the circuit of the system of said copending application.

The output circuit of potentiometer 58, comprising the portion of the winding 58' between the slider 58" and one tap, is connected in series with the output winding 65 of coordinate transformer 43 and also with the control field winding 52 of torque motor 19, as shown in FIG. 2.

Similarly, the output winding 55 of electrical pickup device 22, which is electrically connected to the input winding 60 of coordinate transformer 44, is also electrically connected to the end taps of potentiometer 59. The output circuit of potentiometer 59, comprising the winding 59′ between the movable contact 59″ and one end tap is connected in series with the output winding 66 of coordinate transformer 43 and with the control field winding 53 of torque motor 20, as shown in FIG. 2.

In carrying out the invention, potentiometer 58 is set to provide an output voltage such that motor 19 applies a torque about the $x$ axis equal and opposite to the torque applied about the same axis by spring-like connection 56 when the inner gimbal ring 11 is tilted with respect to gyroscope 10, whereby the effect of the error-producing torque due to spring-like connection 56 is effectively neutralized.

Similarly, potentiometer 59 is set to provide an output voltage of a value such that torque motor 20 applies a torque about the $y$ axis equal and opposite to the torque applied about the same axis due to spring-like connection 57 when the gimbal ring 11 and rotating vertical frame 16 are relatively tilted, whereby the effect of the error-producing torque caused by spring-like connection 57 is effectively neutralized.

Referring now to FIG. 5, that shows a modification of the circuit of FIG. 2 to produce the desired correction in systems where the pickup devices 21 and 22 have insufficient power to drive the torque motors 19 and 20 without amplification. In that case, the effect of the spring-like connections 56 and 57 can be effectively neutralized by applying compensating torques by torque motors 19 and 20 such that the average correcting torque for each revolution at the inner gimbal system is equal and opposite to the average error-producing torque during that revolution. In order to illustrate this condition, assume that the rotational position is such that the mutual induction between windings 62 and 63, and between windings 60 and 61 of coordinate transformer 44 are maximum, then it follows that the mutual induction between windings 64 and 65 and between windings 66 and 67 of coordinate transformer 43 are also maximum, because they rotate through the same angle with shaft 47a. Displacement of the rotor of pickup device 21 produces a voltage across rotor winding 54, which is applied across rotor winding 63 of control transformer 44, thereby inducing voltage in stator winding 62. The portion of this voltage selected by potentiometer 68 is applied to the input of amplifier 48 which is connected in series with the original amplifier input from electrical pickup device 39 and whose output voltage is applied across stator winding 64 of control transformer 43, thereby inducing a voltage in rotor winding 65 which is applied across control field winding 52 of torque motor 19.

Displacement of the rotor 55 of pickup device 22 induces a voltage in rotor winding 55 which is applied to rotor winding 60 of coordinate transformer 44 which in turn induces voltage in stator winding 61. The portion of this voltage which is selected by potentiometer 69 is applied to the input of amplifier 49 connected in series with the original amplifier input from electrical pickup device 40. As shown in FIG. 5, the output voltage of amplifier 49 is applied across stator winding 67 of coordinate transformer 43, thereby inducing a voltage in rotor winding 66 which is applied to control field winding 53 of torque motor 20.

The amplifiers 48 and 49 have the same amplifier voltage gain, herein called K, and the movable contacts of potentiometers 68 and 69 are positioned simultaneously to identical setting so that both potentiometers have the same voltage transformation, herein called ratio $v$. For all rotational positions of the inner rotating gimbal system 11, 16, the electrical pickup device 21, which jointly controls follow-up motors 45 and 46, also controls torque motor 19 to the exclusion of torque 20. Similarly, electrical pickup device 22, which jointly controls follow-up motors 46 and 45, also controls torque motor 20 to the exclusion of torque motor 19. These conditions may be demonstrated mathematically as follows:

Let $p$=output voltage of electrical pickup device 22, $s$=output voltage of electrical pickup device 21, and $\theta$=angular rotational displacement of vertical frame 16 from its zero rotational position, whereby the output voltage of stator winding 61 of coordinate transformer 44 is $(p \cos \theta)-(s \sin \theta)$, and the output of stator winding 62 of coordinate transformer 44 is $(p \sin \theta)+(s \cos \theta)$.

Then the output voltage of rotor winding 65 of coordinate transformer 43 is:

$Kv (p \sin \theta+s \cos \theta) (\cos \theta) -$
$Kv (p \cos \theta-s \sin \theta) (\sin \theta)$, which may be expanded to $Kv (p \sin \theta \cos \theta+s \cos^2\theta-p \sin \theta \cos \theta+s \sin^2\theta)$
and then simplified to $Kvs (\sin^2\theta+\cos^2\theta)$ which may be further simplified to $Kvs$.

The $Kvs$ voltage is applied to the control field winding 52 of torque motor 19, and it is noted that this voltage contains no function of $p$, the output voltage of electrical pickup device 22.

Also, the output voltage of rotor winding 66 of coordinate transformer 43 is $Kv (p \cos \theta-s \sin \theta) (\cos \theta) +$
$Kv (p \sin \theta+s \cos \theta) (\sin \theta)$, which may be expanded to $Kv (p \cos^2\theta-s \sin \theta \cos \theta+p \sin^2\theta+s \sin \theta \cos \theta)$
and then simplified to $Kvp (\sin^2\theta+\cos^2\theta)$, which may be further simplified to $Kvp$.

The $Kvp$ voltage is applied to the control field winding 53 of torque motor 20, and it is noted that this voltage contains no function of $s$, the output voltage of electrical pickup device 21.

Inasmuch as the spring-like torque produced by the tilt between the inner gimbal ring 11 and gyroscope 10 is not necessarily equal to the spring-like torque produced by an equal angular tilt between inner gimbal ring 11 and rotating vertical frame 16, instantaneous correction of the spring-like forces is not provided. Instead, the resultants of the correcting torques applied about the $x$ and $y$ axes by motors 19 and 20 respectively, during each revolution of the inner gimbal system, are averaged, and the average value is applied about an axis perpendicular to the vertical plane containing the spin axis of gyroscope 10 and the $z$ axis 47—47a of gimbal rotation. Inasmuch as this axis is the same axis about which the averaged resultant error-producing torque acts, i.e., that due to spring-like effects, and as the magnitude of the applied averaged resultant correcting torque can be varied by changing the proportion of voltage selected by potentiometers 68 and 69, the averaged resultant correcting torque is made equal in magnitude and opposite in sense to the averaged resultant error-producing torque, whereby the averaged resultant error-producing torque is continuously neutralized.

Although the invention has been described in connection with the operation of a vertical spin axis gyroscope having a rotating inner gimbal system, it is equally well adaptable to the neutralization of the spring-like torques arising in any gyroscopic or other instrument, with or without a rotating gimbal system, and other changes may be made within the scope of the invention as defined by the appended claims.

I claim:

1. A gyroscopic apparatus including a gyroscope suspended in a gimbal mounting on an unstable support, the combination of electrical pickup means responsive to a tilt about one axis of said gimbal mounting for developing a voltage in accordance with the angle of said tilt, electrical motive means connected to said electrical pickup means and energized in accordance with said voltage for exerting a restoring torque about said one axis, and means interposed in said connection for adjusting the said voltage to compensate for the inherent error-producing torques in said apparatus.

2. A gyroscopic apparatus including a gyroscope suspended in a gimbal mounting on an unstable support, the combination of electrical pickup means responsive to tilts about the axes of said gimbal mounting for developing voltages in accordance with the angle of said tilt, electrical motive means connected to each said electrical pickup means and energized in accordance with said voltages for exerting a torque about each correponding gimbal axis, and means interposed in each said connection for adjusting the corresponding voltage to compensate for the inherent error-producing torques in said apparatus.

3. A gyroscopic apparatus including a gyroscope suspended in a gimbal mounting on an unstable support, the combination of electrical pickup means responsive to a tilt about one axis of said gimbal mounting for developing a voltage in accordance with the angle of said tilt, electrical motive means connected to said electrical pickup means and energized in accordance with said voltage for exerting a restoring torque about said one axis, and a potentiometer interposed in said connection for adjusting the said voltage to compensate for the inherent error-producing torques in said apparatus.

4. A gyroscopic apparatus including a gyroscope suspended in a gimbal mounting on an unstable support, the combination of electrical pickup means responsive to tilts about the axes of said gimbal mounting for developing voltages in accordance with the angle of said tilt, electrical motive means connected to each said electrical pickup means and energized in accordance with said voltages for exerting a torque about each corresponding gimbal axis, and a potentiometer interposed in each said connection for adjusting the corresponding voltage to compensate for the inherent error-producing torques in said apparatus.

5. A gyroscopic apparatus including a gyroscope suspended in a gimbal mounting on an unstable support, the combination of electrical pickup means responsive to tilts about the axes of said gimbal mounting for developing voltages in accordance with the angle of said tilt, electrical means connected to each said electrical pickup means and energized in accordance with said voltages for developing corresponding output voltages, electrical motive means connected to said electrical means and energized by the respective output voltages thereof for exerting torques about corresponding gimbal axes, and means interposed in each said last-named connection for adjusting the corresponding voltage to compensate for the inherent error-producing torques in said apparatus.

6. A gyroscopic apparatus including a gyroscope suspended in a gimbal mounting on an unstable support, the combination of electrical pickup means responsive to tilts about the axes of said gimbal mounting for developing voltages in accordance with the angle of said tilt, electrical means connected to each said electrical pickup means and energized in accordance with said voltages for developing corresponding output voltages, electrical motive means connected to said electrical means and energized by the respective output voltages thereof for exerting torques about corresponding gimbal axes, means for rotating said suspension and said electrical means about a substantially vertical axis, and means interposed in each said last-named connection for adjusting the corresponding voltage to compensate for the inherent error-producing torques in said apparatus.

7. In gyroscopic apparatus adapted to be mounted on an unstable support and including a gyroscope suspended in a gimbal mounting on said support, the combination of electrical pickup means responsive to a tilt about one axis of said gimbal mounting for developing a voltage in accordance with said tilt, electrical motive means for exerting a torque about said axis, a transformer having a rotor winding and a stator winding, a second electrical pickup means responsive to movement of said mounting in a predetermined vertical plane for developing a voltage in accordance with said movement, electrical connections between the last-named pickup device and the stator winding of said transformer, means for rotating said mounting about a substantially vertical axis, operative connections between said last-named means and said transformer rotor winding for rotating the same, series electrical connections between the output of said first-named pickup means and said rotor winding and said torque exerting means, and means in said last-named connections for adjusting the voltage supplied to said torque exerting means to compensate for the inherent error-producing torques in said apparatus.

8. In gyroscopic apparatus adapted to be mounted on an unstable support and including a gyroscope suspended in a gimbal mounting on said support, the combination of electrical pickup means responsive to a tilt about each axis of said gimbal mounting for developing a voltage in accordance with said tilt, electrical motive means for exerting a torque about each said axis, a transformer having a pair of rotor windings and a pair of stator windings, a second electrical pickup means responsive to movement of said mounting in coordinate planes for developing voltages in accordance with said movement in each coordinate plane, electrical connections between each last-named pickup device and the corresponding stator winding of said transformer, means for rotating said mounting about a substantially vertical axis, operative connections between said last-named means and said transformer rotor windings for rotating the same, series electrical connections between the output of each said first-named pickup means and said corresponding rotor winding and said torque exerting means, and means in each of said last-named connections for adjusting the voltage supplied to said torque exerting means to compensate for the inherent error-producing torques in said apparatus.

9. In gyroscopic apparatus adapted to be mounted on an unstable support and including a gyroscope suspended in a gimbal mounting on said support, the combination of electrical pickup means responsive to a tilt about one axis of the gimbal mounting, electrical motive means for exerting a torque about said axis, a transformer having a rotor winding and a stator winding, electrical pickup means responsive to movement in a predetermined vertical plane, a second transformer having a rotor winding and a stator winding, second electrical pickup means responsive to movement about one of said gimbal axes and connected to the second transformer rotor winding, series connections between said first pickup means and the second transformer winding and said motive means, means for rotating said gimbal mounting about a substantially vertical axis, operative connections between said rotating means and the rotor windings of said transformers, and means interposed in said connections for adjusting the voltage supplied to said torque-exerting means to compensate for the inherent error-producing torques in said apparatus.

10. In gyroscopic apparatus including a vertical axis gyroscope suspended in a gimbal mounting on an unstable support and rotated about a substantially vertical axis, the combination of electrical means for exerting torque couples about the respective coordinate gimbal axes of said mounting, a transformer having rotor windings rotated with said mounting and having stator windings, electrical pickup means corresponding to said torque couple-exerting means and responsive to relative movement about the corresponding coordinate axes for supplying to said corresponding transformer rotor windings a voltage having a magnitude in accordance with said relative movement, thereby inducing voltages in the corresponding stator windings, connections between said stator windings and said corresponding torque couple-exerting means whereby said each last means exerts a torque couple about the corresponding gimbal axis, and means in each of said connections for adjusting the voltage supplied to the corresponding torque couple-exerting means to compensate for the inherent error-producing torques in said apparatus.

11. In gyroscopic apparatus including a vertical axis gyroscope suspended in a gimbal mounting on an unstable support and rotated about a substantially vertical axis, the combniation of electrical means for exerting torque couples about the respective coordinate gimbal axes of said mounting, a transformer having rotor windings rotated with said mounting and having stator windings, electrical pickup means corresponding to said torque couple-exerting means and responsive to relative movement about the corresponding coordinate axes for supplying to said corresponding transformer rotor windings a voltage having a magnitude in accordance with said relative movement, thereby inducing voltages in the stator windings, connections between said stator windings and said corresponding torque couple-exerting means whereby each said last means exerts a torque couple about the corresponding gimbal axis, and a potentiometer in each of said connections for adjusting the voltage supplied to the corresponding torque couple-exerting means to compensate for the inherent error-producing torques in said apparatus.

12. In gyroscopic apparatus including a vertical axis gyroscope suspended in a gimbal mounting on an unstable support and rotated about a substantially vertical axis, the combination of electrical means for exerting torque couples about the respective coordinate gimbal axes of said mounting, a transformer having rotor windings rotated with said mounting and having stator windings, a pair of pendulums responsive to relative movement in coordinate planes, a pair of energized stator windings and corresponding rotor windings connected to the respective pendulums for supplying to said corresponding transforming stator windings voltages having a magnitude in accordance with said relative movement, thereby inducing in said corresponding transformer rotor windings voltages proportional to said corresponding relative movement and to a trigonometric function of the relative angular displacement between said transformer rotor and stator windings, electrical connections between each said transformer rotor winding and the corresponding torque couple-exerting means, whereby said last-named means exerts a torque couple about the corresponding gimbal axis, and means in each of said last-named connections for adjusting the voltage supplied to the corresponding torque couple-exerting means to compensate for the inherent error-producing torques in said apparatus.

13. In gyroscopic apparatus including a vertical axis gyroscope suspended in a gimbal mounting on an unstable support and rotated about a substantially vertical axis, the combination of electrical means for exerting torque couples about the respective coordinate gimbal axes of said mounting, a transformer having rotor windings rotated with said mounting and having stator windings, a pair of pendulums responsive to relative movement in coordinate planes, a pair of energized stator windings and corresponding rotor windings connected to the respective pendulums for supplying to said corresponding transforming stator windings voltages having a magnitude in accordance with said relative movement, thereby inducing in said corresponding transformer rotor windings voltages proportional to said corresponding relative movement and to a trigonometric function of the relative angular displacement between said transformer rotor and stator windings, electrical connections between each said transformer rotor winding and the corresponding torque couple-exerting means, whereby said last-named means exerts a torque couple about the corresponding gimbal axis, and a potentiometer in each of said last-named connections for adjusting the voltage supplied to the corresponding torque couple-exerting means to compensate for the inherent error-producing torques in said apparatus.

14. In gyroscopic apparatus including a vertical axis gyroscope suspended in a gimbal mounting on an unstable support and rotated about a substantially vertical axis, the combination of electrical means for exerting a torque couple about at least one of the gimbal axes of said mounting, a transformer having a rotor winding rotated with said mounting and having a stator winding, a pendulum responsive to tilting of the support, an energized stator winding and a corresponding rotor winding connected to said pendulum for supplying to said stator winding a voltage having a magnitude in accordance with said tilt, thereby inducing in said transformer rotor winding a voltage proportional to said tilt and to a trigonometric function of the relative angular displacement between said transformer rotor and stator windings, an electrical pickup device responsive to angular movement about said one gimbal axis for developing voltage in accordance with the angle of said movement, series electrical connections between said transformer rotor winding and said pickup device and said torque couple-exerting means, whereby said last-named means exerts a torque couple about said one gimbal axis, and means interposed in said last-named connections for adjusting the voltage supplied to said torque couple-exerting means to compensate for the inherent error-producing torques about said one axis.

15. In gyroscopic apparatus including a vertical axis gyroscope suspended in a gimbal mounting on an unstable support and rotated about a substantially vertical axis, the combination of electrical means for exerting a torque couple about at least one of the gimbal axes of said mounting, a transformer having a rotor winding rotated with said mounting and having a stator winding, a pendulum responsive to tilting of the support, an energized stator winding and a corresponding rotor winding connected to said pendulum for supplying to said stator winding a voltage having a magnitude in accordance with said tilt, thereby inducing in said transformer rotor winding a voltage proportional to said tilt and to a trigonometric function of the relative angular displacement between said transformer rotor and stator windings, an electrical pickup device responsive to angular movement about said one gimbal axis for developing voltage in accordance with the angle of said movement, series electrical connections between said transformer rotor winding and said pickup device and said torque couple-exerting means, whereby said last-named means exerts a torque couple about said one gimbal axis, and a potentiometer interposed in said last-named connections for adjusting the voltage supplied to said torque couple-exerting means to compensate for the inherent error-producing torques about said one axis.

16. In gyroscopic apparatus, including a vertical axis gyroscope suspended in a gimbal mounting on an unstable support and rotated about a substantially vertical axis, the combination of electrical means for exerting a torque couple about at least one of the gimbal axes of said mounting, a transformer having a rotor winding rotated with said mounting and having a stator winding, electrical pickup means responsive to relative movement of the support in a predetermined vertical plane for supplying to said stator winding a voltage in accordance with said relative movement, a second transformer having a rotor winding rotated with said mounting and having a stator winding, a second electrical pickup device responsive to relative movement about one of said gimbal axes for supplying to said second transformer stator winding a voltage in accordance with said last-named relative movement, series connections between said rotor windings and said torque couple-exerting means, whereby said last-named means exerts a torque couple about said gimbal axis, and means in said last-named connections for adjusting the voltage supplied to said torque couple-exerting means to compensate for the inherent error-producing torques in said apparatus.

17. In gyroscopic apparatus including a vertical axis gyroscope suspended in a gimbal mounting on an unstable support and rotated about a substantially vertical axis, the combination of electrical means for exerting a torque couple about the gimbal axes of said mounting, a transformer having a pair of rotor windings rotated with said mounting and having a pair of stator windings, electrical pickup means responsive to relative movement of the support in coordinate planes for supplying to each of said stator windings a voltage in accordance with said relative movement in said corresponding coordinate planes, a second transformer having a pair of rotor windings rotated with said mounting and having a pair of stator windings, a pair of second electrical pickup devices responsive to relative movement about corresponding gimbal axes for supplying to each of said second transformer stator windings a voltage in accordance with said last-named relative movement about the corresponding gimbal axes, series connections between said corresponding rotor windings and said corresponding torque couple-exerting means, whereby said last-named means exerts a torque couple about said corresponding gimbal axis, and means in each of said last-named connections for adjusting the voltage supplied to said torque couple-exerting means to compensate for the inherent error-producing torques in said apparatus.

18. In gyroscopic apparatus, including a vertical axis gyroscope suspended in a gimbal mounting on an unstable support and rotated about a substantially vertical axis, the combination of electrical means for exerting a torque couple about at least one of the gimbal axes of said mounting, a transformer having a rotor winding rotated with said mounting and having a stator winding, electrical pickup means responsive to tilting of the support in a predetermined vertical plane for supplying to said stator winding a voltage in accordance with said tilt, a second transformer having a rotor winding rotated with said mounting and having a stator winding, a second electrical pickup device responsive to relative movement about one of said gimbal axes for supplying to said second transformer stator winding a voltage in accordance with said last-named relative movement, series connections between said rotor windings and said torque couple-exerting means, whereby said last-named means exerts a torque couple about said gimbal axis, and a potentiometer in said last-named connections for adjusting the voltage supplied to said torque couple-exerting means to compensate for the inherent error-producing torques in said apparatus.

19. A gyroscopic apparatus adapted to be mounted on an unstable support and including an electrically driven gyroscope, a gimbal suspension for said gyroscope mounted on said support having relatively movable parts including inner and outer gimbal rings journalled together with the gyroscope journalled on said inner gimbal ring and flexible electrical conductors extending between at least two of said relatively movable parts and affording some resistance to free relative movement between said last-named parts, the combination of an electrical pickup device responsive to said relative movement for developing a proportional voltage, electrical motive means exerting a torque between said parts, electrical connections between said pickup and motive means, and means in said connections for adjusting the torque exerted by said motive means to compensate for the resistance to movement by said conductors.

20. A gyroscopic apparatus adapted to be mounted on an unstable support and including an electrically driven gyroscope, a gimbal suspension for said gyroscope mounted on said support having relatively movable parts including inner and outer gimbal rings journalled together with the gyroscope journalled on said inner gimbal ring and flexible electrical conductors extending between at least two of said relatively movable parts and affording some resistance to free relative movement between said last-named parts, the combination of an electrical pickup device responsive to said relative movement about the axis of said last-named journal for developing a proportional voltage, electrical motive means exerting a torque about said axis, electrical connections between said pickup and said motive means, and means in said connections for adjusting the torque exerted by said motive means to compensate for the resistance to movement by said conductors.

References Cited in the file of this patent

UNITED STATES PATENTS

| | | |
|---|---|---|
| 2,293,039 | Esval | Aug. 18, 1942 |
| 2,411,087 | Ford et al. | Nov. 12, 1946 |